United States Patent
Schuitema et al.

(10) Patent No.: US 8,167,116 B2
(45) Date of Patent: May 1, 2012

(54) REDUCING DRAG ON THE WEB OF A POSITIVE DISPLACEMENT SORTER

(75) Inventors: Dennis J. Schuitema, Ada, MI (US); Stephen C. Wolf, Grand Rapids, MI (US); Kenneth J. Kooistra, Byron Center, MI (US); David M. Berghorn, Waterford, MI (US)

(73) Assignee: Dematic Corp., Grand Rapids, MI (US)

( * ) Notice: Subject to any disclaimer, the term of this patent is extended or adjusted under 35 U.S.C. 154(b) by 339 days.

(21) Appl. No.: 12/560,612

(22) Filed: Sep. 16, 2009

(65) Prior Publication Data
US 2010/0300835 A1 Dec. 2, 2010

Related U.S. Application Data

(60) Provisional application No. 61/181,138, filed on May 26, 2009.

(51) Int. Cl.
*B65G 47/10* (2006.01)
(52) U.S. Cl. ............... 198/617; 198/370.02; 198/370.07
(58) Field of Classification Search ............. 198/370.02, 198/370.07, 617, 806, 807
See application file for complete search history.

(56) References Cited

U.S. PATENT DOCUMENTS

| | | | |
|---|---|---|---|
| 4,711,341 A | 12/1987 | Yu et al. | |
| 4,760,908 A | 8/1988 | Houghton | |
| 4,884,677 A | 12/1989 | Yu et al. | |
| 5,127,510 A | 7/1992 | Cotter et al. | |
| 5,131,522 A | 7/1992 | Fujio | |
| 5,595,279 A | 1/1997 | Wilkins et al. | |
| 5,909,797 A | 6/1999 | Van Den Goor | |
| 6,814,216 B2 * | 11/2004 | Veit et al. | 198/370.02 |
| 6,860,383 B2 * | 3/2005 | Veit et al. | 198/815 |
| 6,866,136 B2 * | 3/2005 | Veit et al. | 198/370.02 |
| 7,086,519 B2 * | 8/2006 | Veit et al. | 198/370.02 |
| 7,370,751 B2 * | 5/2008 | Smith et al. | 198/500 |
| 7,383,936 B2 | 6/2008 | Enomoto | |
| 7,562,761 B2 * | 7/2009 | Tasma et al. | 198/370.02 |
| 7,628,265 B2 * | 12/2009 | Verploegen et al. | 198/370.02 |
| 7,641,039 B2 * | 1/2010 | Smith et al. | 198/370.03 |
| 7,779,986 B2 * | 8/2010 | Enomoto | 198/370.02 |

FOREIGN PATENT DOCUMENTS

JP 8020429 A 1/1996

* cited by examiner

*Primary Examiner* — Douglas Hess
(74) *Attorney, Agent, or Firm* — Gardner, Linn, Burkhart & Flory, LLP (57) ABSTRACT

A method of reducing drag on the web of a positive displacement sorter is used with a web made up of a plurality of parallel slats interconnected at their opposite ends with chain assemblies in an endless loop. A plurality of pusher shoes each travel along at least one of said slats. The sorter further includes a driven sprocket assembly and a non-driven sprocket assembly. Each of the sprocket assemblies includes at least two sprockets on a shaft, each for engaging one of the chain assemblies. The sprocket assemblies support the chain assemblies at opposite ends of the web. The method includes auditing the sorter including determining if the slats are skewed with respect to the direction of travel of the web. If it is determined that the slats are skewed, then the chain assemblies and the non-driven sprocket assembly are modified. The chain assemblies are modified by adding side thrust wheels on opposite sides of the web. The non-driven sprocket is modified by locking the sprockets to the shaft such that the sprockets rotate together.

20 Claims, 7 Drawing Sheets

REDUCING DRAG ON THE WEB OF A POSITIVE DISPLACEMENT SORTER

CROSS REFERENCE TO RELATED APPLICATION

This application claims priority from U.S. provisional patent application Ser. No. 61/181,138, filed on May 26, 2009, the disclosure of which is hereby incorporated herein by reference in its entirety.

BACKGROUND OF THE INVENTION

The present invention is directed to reducing drag on the web of a positive displacement sorter. While the invention may be used with a sorter that has been in use for some time and may have experienced degraded performance, it can also be installed with a new sorter as a preventative accessory.

A positive displacement sorter includes a web that is made up of a plurality of parallel slats interconnected at their opposite ends with chains in an endless loop, the upper run of which defines a conveying surface. The endless loop, or conveyor, is driven by an electric motor. A plurality of pusher shoes travel along the slats in order to laterally displace articles carried by the conveying surface, such as to one of a plurality of takeaway spurs. The sorter may further include a driven sprocket assembly that is driven by the electric motor and a non-driven sprocket assembly that is free to rotate. The sprocket assemblies support the chains at opposite ends of the web. Each of the sprocket assemblies is made up of at least two sprockets on a shaft, each for engaging one of the chains.

From time to time, a sorter experiences an increase in drag on the web. Such drag may result in an increase in the electrical current, or amps, drawn by the electric motor driving the web. While an increase in electrical current is an indication that the web is experiencing an increase in drag, or mechanical resistance, it has proven illusive to determine the cause of the increased drag much less to provide a suitable solution that reduces drag and, hence, motor electrical current. An increase in drag may express itself in other ways, such as an increase in audible noise as well as visual appearance of the web itself. Past attempts at a solution for increase in drag have been to adjust oil applied to one or both of the chains. Such solution not only may fail to resolve the problem, it may also result in oil discharge to the floor, or the like.

SUMMARY OF THE INVENTION

The present invention provides a method for reducing drag on the web of a positive displacement sorter that both positively identifies the cause and produces a satisfactory solution.

A method of reducing drag on the web of a positive displacement sorter, according to an aspect of the invention, is used with a web made up of a plurality of parallel slats interconnected at their opposite ends with chain assemblies in an endless loop. A plurality of pusher shoes each travel along at least one of said slats. The sorter further includes a driven sprocket assembly and a non-driven sprocket assembly. Each of the sprocket assemblies includes at least two sprockets on a shaft, each for engaging one of the chain assemblies. The sprocket assemblies support the chain assemblies at opposite ends of the web. The method includes auditing the sorter including determining if the slats are skewed with respect to the direction of travel of the web. If it is determined that the slats are skewed, then the chain assemblies and the non-driven sprocket assembly are modified. The chain assemblies are modified by adding side thrust wheels on opposite sides of the web. The non-driven sprocket is modified by locking the sprockets to the shaft such that the teeth of the two sprockets are in line with each other and the sprockets rotate together.

The chain assemblies may include chains and wherein the modifying of the chain assemblies may include replacing at least some existing brackets with new brackets that connect the chains with said slats. The new brackets have the side thrust wheels. Alternatively, the modifying of the chain assemblies may include replacing the chain assemblies with new chain assemblies having the side thrust wheels.

The adding of side thrust wheels may include adding the side thrust wheels to fewer than all of the slats. The side thrust wheels may be positioned on alternate sides of the web such that each of the slats has no more than one of the side thrust wheels. The side thrust wheels may be positioned, for example, on no more than every sixth slat on a side of said web. Alternatively, the side thrust wheels may be positioned on no more than every seventh slat on a side of the web.

The sorter may further include a frame that moveably supports the web. The frame may include facing confinement surfaces for resisting lateral movement of said web. The auditing may further include determining spacing between the confinement surfaces. The confinement surfaces may be defined by low friction bars. The method may further include adjusting positions of at least some of the bars to adjust the spacing between the confinement surfaces. The adjusting positions of at least some of the bars may be carried out by shimming the bars with respect to the frame.

The auditing may be carried out by positioning at least one sensor on one of the slats and operating the sorter while monitoring the sensor(s). The sorter may include an oiler that applies oil intermittently at each of the chains according to a program. The method may further include adjusting the program.

The auditing may include measuring spacing of the slats at opposite ends of the slats from a fixed reference and the determining may include determining slat skew as a function of the difference in spacing of the slats from the fixed reference at one side of the web to the spacing of the slats from the fixed reference at the opposite side of the web.

A positive displacement sorter, according to an aspect of the invention, includes a web made up of a plurality of parallel slats interconnected at their opposite ends with chain assemblies in an endless loop and a plurality of pusher shoes, each traveling along at least one of the slats. A driven sprocket assembly and a non-driven sprocket assembly are provided, each of the sprocket assemblies having at least two sprockets on a shaft each for engaging one of the chain assemblies. The sprocket assemblies support the chain assemblies at opposite ends of the web. The sprockets of the non-driven sprocket assembly lock to the shaft such that the sprockets of the non-driven sprocket assembly rotate together. Side thrust wheels are provided on opposite sides of the web.

The side thrust wheels may be at fewer than all of the slats. The side thrust wheels may be on alternate sides of the web such that each of the slats has no more than one of said side thrust wheels. The side thrust wheels may be positioned on no more than every sixth slat or on every seventh slat on a side of the web. The sorter may further include a frame that moveably supports the web. The frame has facing confinement surfaces that resist lateral movement of the web. The confinement surfaces may be defined by low friction bars.

A pair of chain assemblies, according to another aspect of the invention, are provided for use with a web, the web having a plurality of parallel slats interconnected at their opposite lateral end portions with the chain assemblies in an endless loop. The web further includes a plurality of pusher shoes, each traveling along at least one of the slats. The pair of chain assemblies includes first and second endless chains and a plurality of vertical support wheels attached to each of said chains for supporting one lateral end portion of the web. One of the support wheels is positioned at each of the slats. A plurality of side thrust wheels are provided that are attached to each of said chains and rotate on an axis that is perpendicular to the axis of rotation of the support wheels. The side thrust wheels are for resisting lateral movement of the web. No more than one of said side thrust wheels is provided for at least every six or every seventh of the support wheels. The side thrust wheels of one of said chain assemblies may be longitudinally offset from said side thrust wheels of the other of the chain assemblies.

These and other objects, advantages and features of this invention will become apparent upon review of the following specification in conjunction with the drawings.

DETAILED DESCRIPTION OF THE PREFERRED EMBODIMENT

Figure 1:
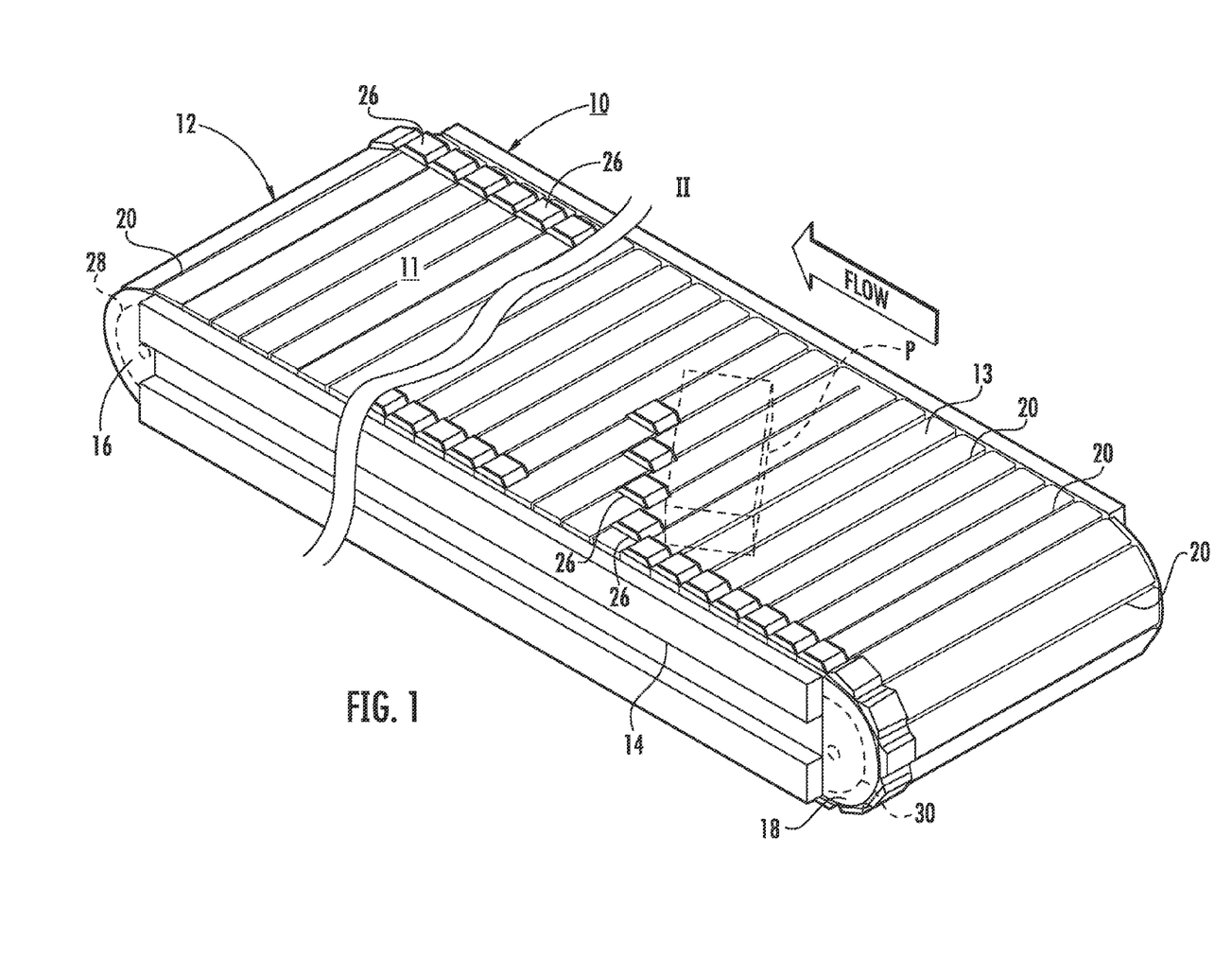
FIG. 1 is a perspective view of a positive displacement sorter, according to an embodiment of the invention.
Figure 2:
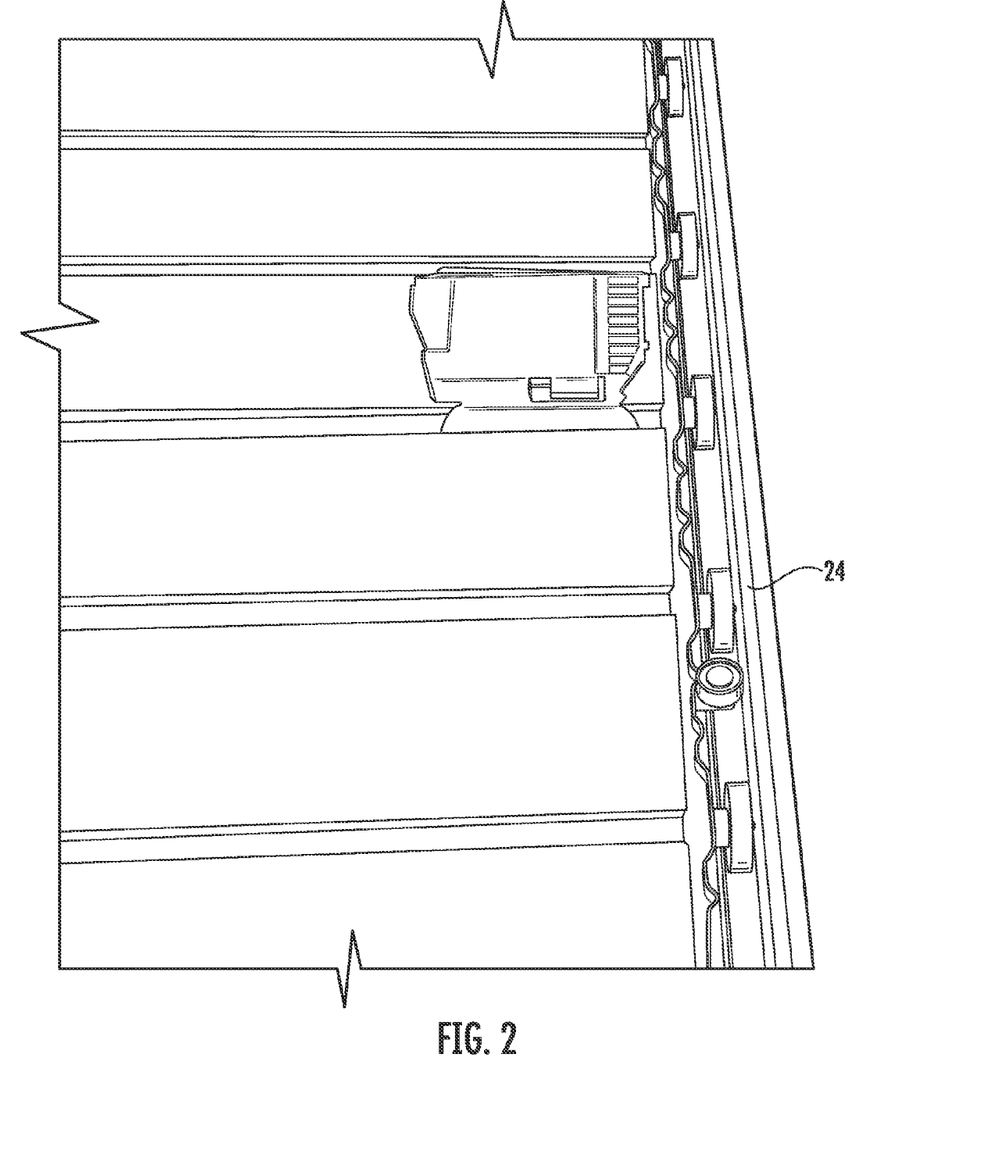
FIG. 2 is a top plan view of the sorter in FIG. 1.

Referring to the drawings and the illustrative embodiments depicted therein, a positive displacement sorter 10 includes a moving web 12, an upper run of which defines a conveying surface 11 (FIG. 1). Web 12 is made up of a plurality of parallel slats 20 interconnected at their opposite ends with chain assemblies 22a, 22b (not shown in FIG. 1) in an endless loop and a plurality of pusher shoes 26, each traveling along at least one of slats 20. Sorter 10 further includes a driven sprocket assembly 28 at an article discharge end portion 16 of the conveying surface and a non-driven sprocket assembly 30 at an article charge end portion 18 of the conveying surface. As will be described in more detail below, each of sprocket assemblies 28, 30 include at least two sprockets on a shaft each for engaging one of chain assemblies 22a, 22b. Sprocket assemblies 28, 30 support chain assemblies 22a, 22b at opposite longitudinal ends of web 12. Details of sorter 10 are disclosed in commonly assigned U.S. Pat. No. 5,127,510, the disclosure of which is hereby incorporated herein by reference. Suffice it to say that diverting mechanisms under conveying surface 11 cause select pusher shoes 26 to divert on a diagonal, as seen in FIG. 1, to divert an article P to a take away spur (not shown). Alternatively, sorter 10 may utilize parallel diverting, as disclosed in commonly assigned U.S. Pat. No. 5,165,515, the disclosure of which is hereby incorporated herein by reference, or a combination of diagonal diverting and parallel diverting. Sorter 10 includes a frame 14 that moveably supports web 12, namely supports the web in a manner that allows the web to move or travel. Frame 14 has facing confinement surfaces defined by confinement members 24 for resisting lateral movement of the web. Confinement members 24 may be defined by low friction bars, made up of a low friction material, such as ultra high molecular weight (UHMW) material, or the like.

Figure 4:
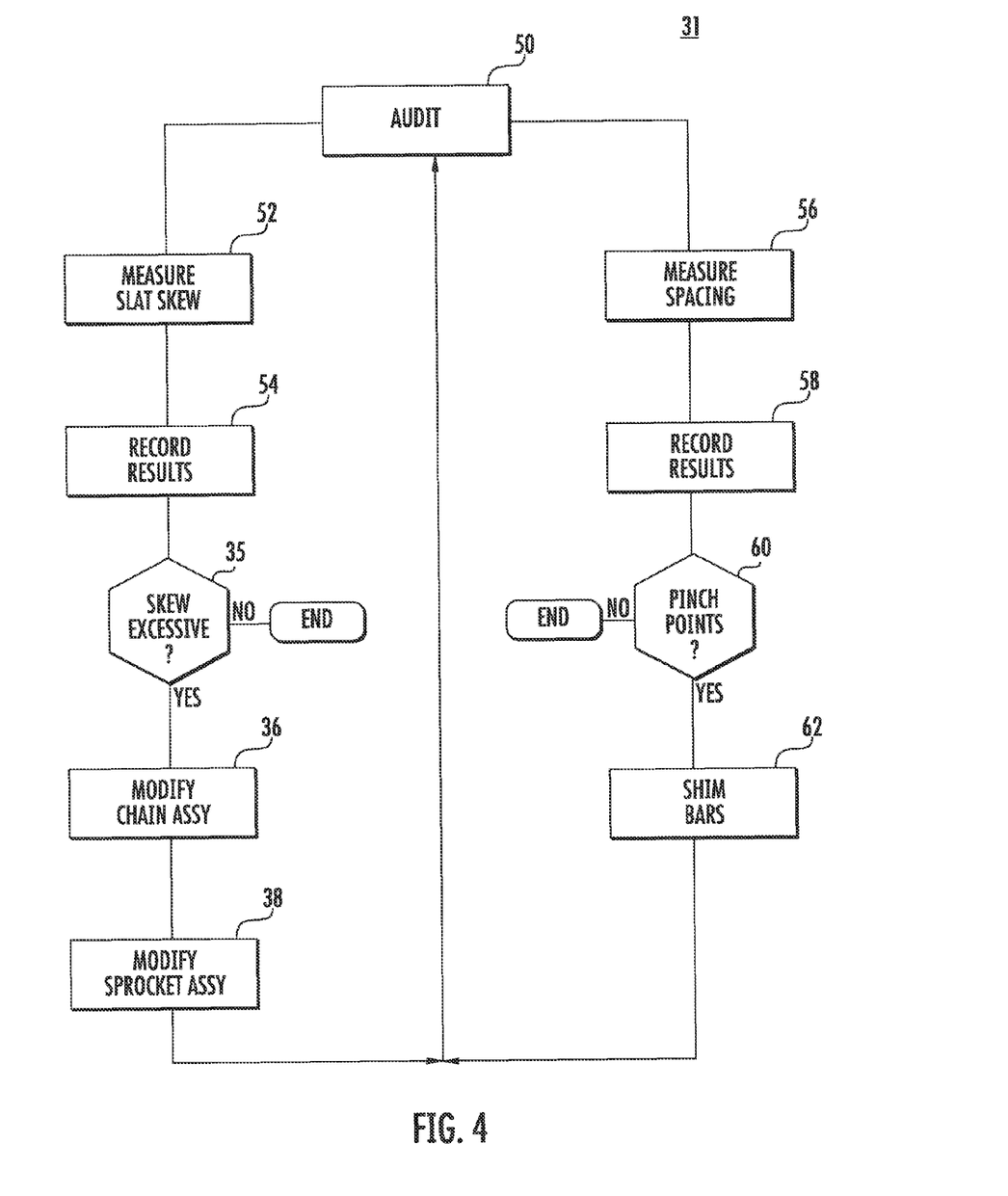
FIG. 4 is a flowchart of a method diagnosing and curing drag.

If it is determined that web 12 is experiencing an increase in drag, a method 31 may be performed to diagnose and cure the excessive drag (FIG. 4). Such increase in drag may be observed, for example, by observing an increase in electrical current, or amp draw, experienced by the motor (not shown) that rotates driven sprocket assembly 28. Alternatively, drag may be observed from operation of the web itself, such as by observing a skew in slats 20 with respect to direction of travel of said web or any other indication, such as excessive audible noise, or the like, that the sorter is not operating at or near its design parameters. If it is determined that the web is experiencing drag, method 31 begins with an audit 50 being performed to diagnose the source(s) of the drag.

Figure 3:
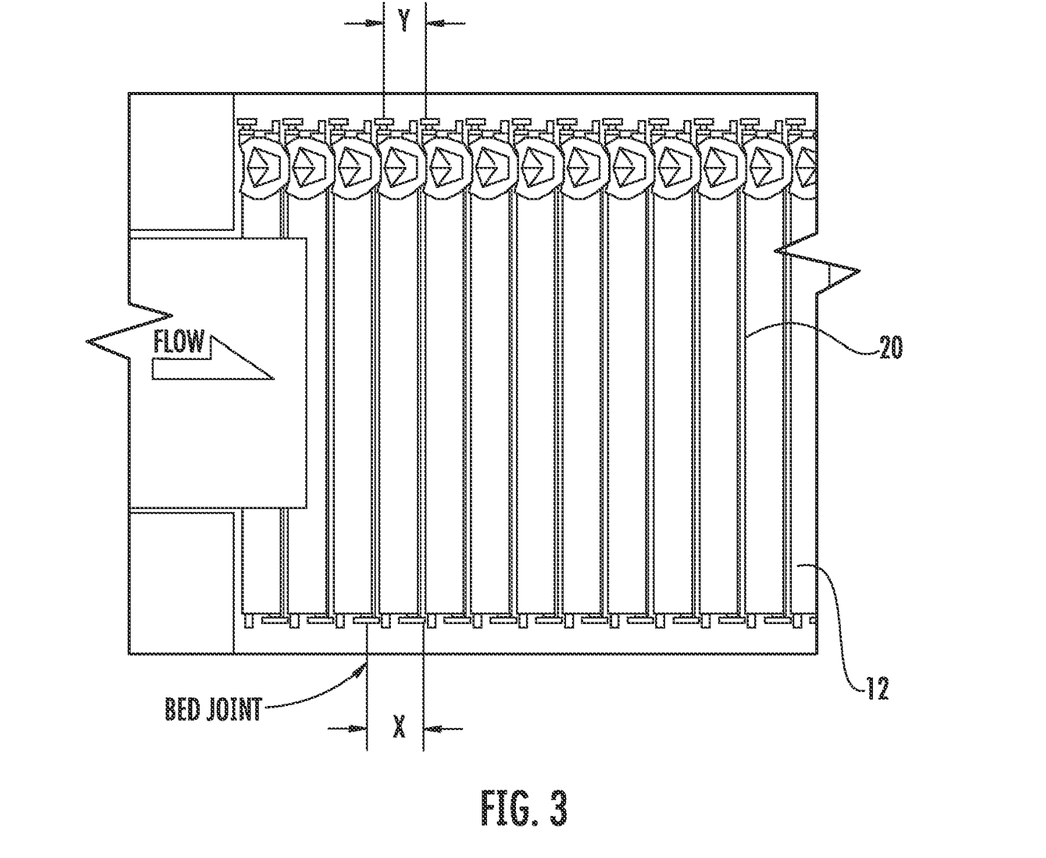
FIG. 3 is a top plan view of the sorter in FIG. 1 illustrating an auditing technique for skew measurement.

Audit 50 may involve one or a combination of tests or measurements made on the sorter. One measurement may be a measurement (52) of the skew of the slats with respect to direction of travel of the web. As can be seen by reference to FIG. 3, slat skew may be measured, with the bed stationary, by measuring the distance between one lateral end of the slats from a stationary feature of the sorter, such as a bed joint. This distance is shown as the variable "X". Also the distance between the opposite lateral end of the slats and the same stationary feature of the sorter is measured and designated the variable "Y". Slat skew may be defined as the difference between these parameters, or (X-Y). The slat skew is a positive number if one lateral end of the slats is leading the other end and a negative number if the other end is leading. Skew may be measured in multiple locations along the length of web 12. Records may be made (54) of the skew and the amp draw of the motor (not shown) for later comparison after modifications are made to sorter 10. Other techniques may be used for measuring slat skew. For example, slat skew may be measured by positioning at least one sensor on one of slats 20 and operating sorter 10 while monitoring the at least one sensor as disclosed in commonly assigned U.S. Pat. No. 7,370,751 for a SKEWED SLAT CONTROL SYSTEM FOR ARTICLE CONVEYOR, the disclosure of which is hereby incorporated herein by reference.

If audit 50 determines (35) that slats 20 are experiencing excessive skew with respect to the direction of travel of web 12, then one or more steps are performed to reduce the skew. Such steps may include modifying (36) chain assemblies 22a, 22b, modifying (38) non-driven sprocket assembly 30, or both. As will be explained in more detail below, the step 36 of modifying chain assemblies 22a, 22b may include adding side thrust wheels 40 on opposite sides of web 12 to provide a modified web 112. Side thrust wheels 40 are mounted for rotation about vertical axis and are positioned to resist excess lateral motion of web 112.

Figure 5:
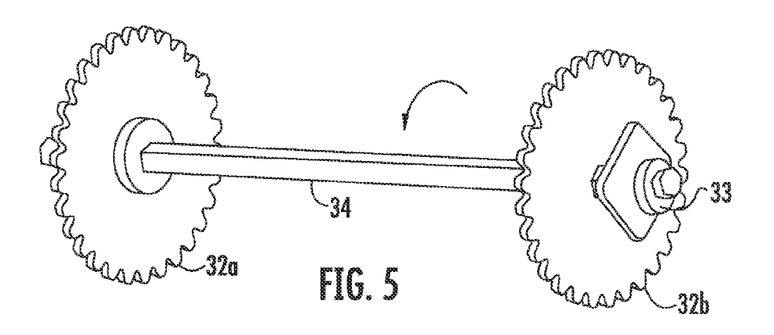
FIG. 5 is a perspective view of a replacement non-driven sprocket assembly.
Figure 6A:
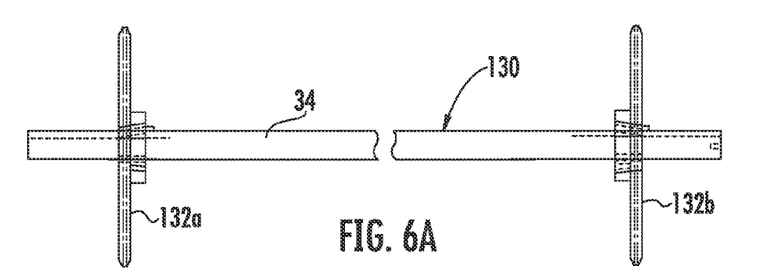
FIG. 6a is an end elevation of the sprocket assembly in FIG. 4.
Figure 6B:
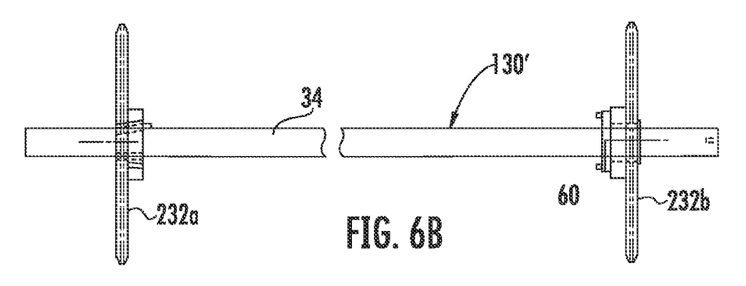
FIG. 6b is the same view as FIG. 6a of an alternative embodiment thereof.

Non-driven sprocket assembly 30 traditionally includes a pair of sprockets 32a, 32b, one for each of chain assemblies 22a, 22b and a shaft 34 for rotatably supporting sprockets 32a, 32b (FIG. 5). Because the purpose of non-driven sprocket assembly 30 is to support the end of the web opposite to driven sprocket assembly 28, it is common for the two sprockets to be independently rotatable in order to allow the load of driving the web to be applied to both of the chain assemblies without one of the chains carrying all or most of the load. In particular, existing non-driven sprocket assembly 30 may include a shaft 34, a sprocket 32a that is keyed to shaft 34 and therefore rotates the shaft, which is supported by bearings 33 (FIG. 5). Non-driven sprocket assembly 30 may further include a sprocket 32b that is not keyed to shaft 34. Thus, sprocket 32b can rotate independent of the shaft and therefore independent of sprocket 32a. Method step 38 includes modifying non-driven sprocket assembly 30 to provide a modified non-driven sprocket assembly 130 in which both sprockets 32a, 32b are locked to shaft 34 with the teeth of the sprockets generally aligned with each other such that sprockets 32a, 32b are constrained to rotate together regardless of the load placed on chain assemblies 22a, 22b. Non-driven sprocket assembly 130 may include first and second sprockets 132a, 132b that are both keyed to shaft 34 and are thereby locked together. Such a configuration is useful where the entire non-driven sprocket assembly is to be replaced with a modified non-driven sprocket assembly. This is because it requires machining of key slots in the shaft which is best performed in a factory, not in the field. An alternative modified non-driven sprocket assembly 130' may include an existing first sprocket 232a keyed to the shaft and a new sprocket 232b that is coupled to rotate with the shaft by a locking bushing 60, or the like. Because locking bushing 60 does not require a key slot to be machined into shaft 34, it may be installed in the field as part of a retrofit of the sorter.

Figure 7:
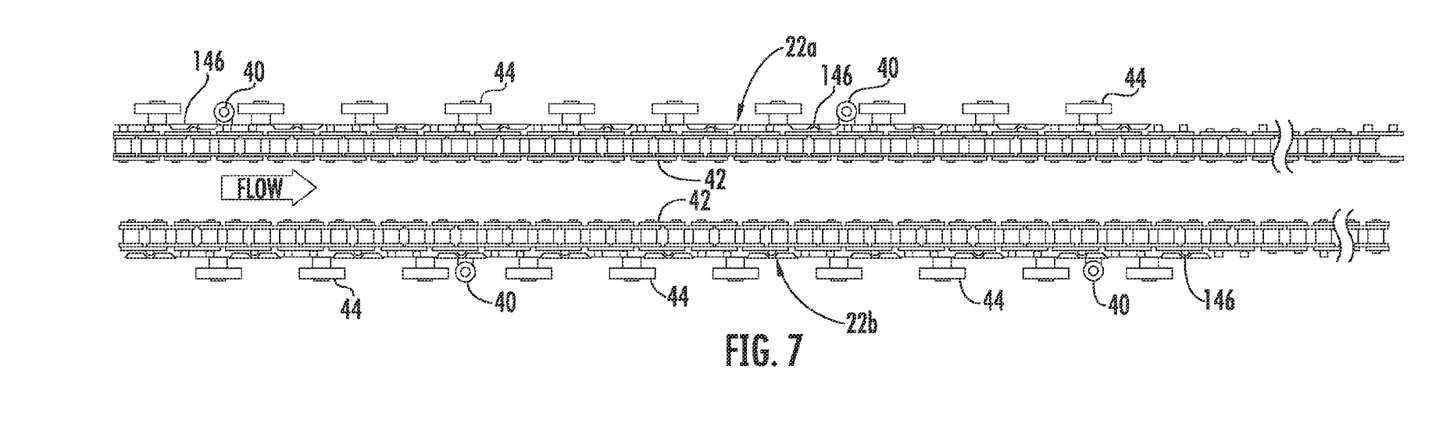
FIG. 7 is a top plan view of a pair of chain assemblies.
Figure 8:
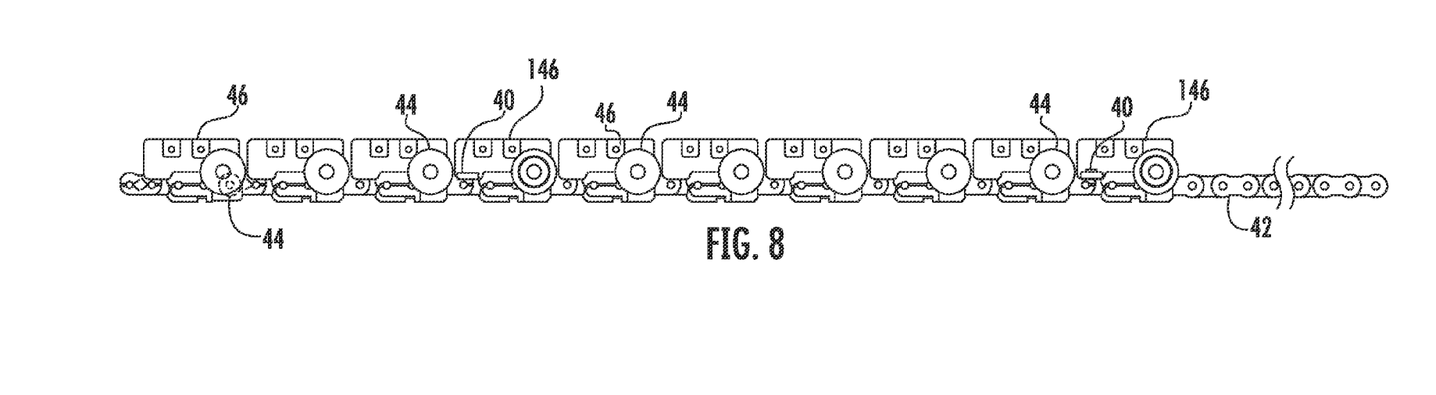
FIG. 8 is a side elevation of the chain assemblies of FIG. 7.
Figure 9:
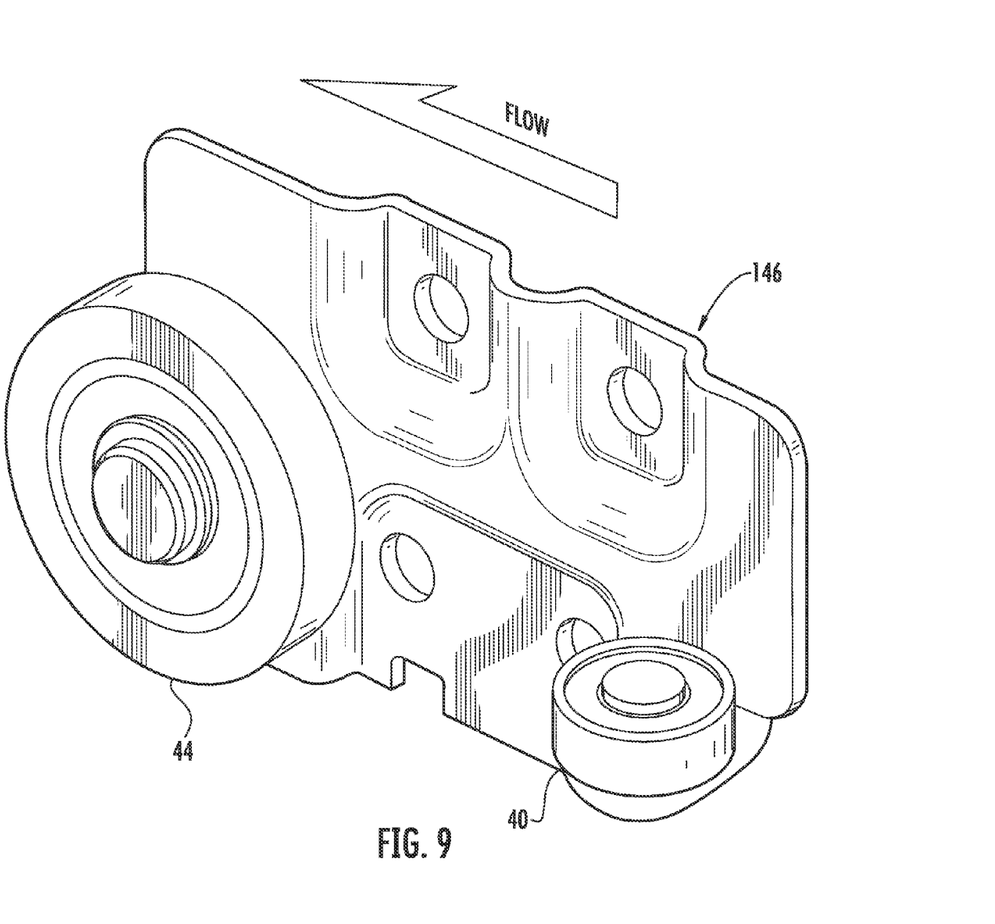
FIG. 9 is a perspective view of a wheel bracket with the support wheel and side thrust wheel installed.

Chain assemblies 22a, 22b may each be made up of chains, such as roller chains 42, vertically oriented support wheels 44 and brackets 46 for mechanically connecting chains 42 with slats 20 and with support wheels 44 (FIGS. 7 and 8). Support wheels 44 support the web and the loads carried by conveying surface 11 against the force of gravity, while facilitating movement of the web on frame 14. The step of modifying (36) the chain assemblies may include replacing at least some existing brackets 46 with new brackets 146. In addition to connecting chains 42 with slats 20 and support wheels 44, brackets 146 mount side thrust wheels 40. Alternatively, the step of modifying chain assemblies 22a, 22b may include replacing chain assemblies 22a, 22b with new chain assemblies having side thrust wheels 40 installed at the factory.

The step of modifying (36) chain assemblies 22a, 22b may include providing side thrust wheels 40 with fewer than all of slats 20. Side thrust wheels 40 may be positioned on alternate lateral sides of web 112 such that each of said slats has no more than one side thrust wheel 40. The purpose of such staggering of the side thrust wheels is as follows. The lateral distance between confinement surfaces 24 of sorter 10 is nominally slightly greater than the lateral width of web 12 in order to avoid excessive lateral movement of the web but avoiding pinching of the web. The providing of side thrust wheels 40 is performed within the narrow clearances between web 12 and confinement surfaces 24. This is accomplished by having only one side thrust wheel 40 between the web and one of the confinement surfaces at each longitudinal position along the web. Thus, the addition to the width of web 12 is no greater than the distance that one side thrust wheel 40 extends beyond the lateral surface of vertical support wheels 44. In the illustrative embodiment, each side thrust wheel 40 adds approximately 0.030 inches to the width of web 112 over that of web 12. This reduction in the amount of width added to the web may be enhanced by longitudinally spacing apart the side thrust wheels along the web with multiple empty slats between slats having a side thrust wheel 40. This further spacing apart of the side thrust wheels allows for slight lateral flexing of web 12 in order to ensure that the width added to web 12 is, indeed, no more than the width added by one side thrust wheel 40. However, side thrust wheels 40 are close enough together to generally ensure that significant contact between web 112 and confinement surfaces 24 occurs only at the side thrust wheels. In the illustrative embodiment, the side thrust wheels may be positioned on every sixth slat on a side of web 112, as illustrated in FIG. 7. Alternatively, the side thrust wheels may be positioned on every seventh slat on a side of web 112. The difference between spacing the side thrust wheels every sixth or every seventh slat may be a function of standard lengths that chain assemblies 22a, 22b are supplied from the factory. However, it should be understood that a greater or lesser number of empty slats may be positioned between the side thrust wheels.

Another audit step (50) may be to measure distances (56) between confinement surfaces 24. The lateral spacing between the confinement surfaces 24 may be measured in order to determine if there is sufficient clearance between the confinement surfaces at all locations along frame 14 to avoid binding of the web between the confinement surfaces. The spacing between confinement surfaces defined by bars 24 may be measured manually. Alternatively, the spacing may be measured using the method and apparatus disclosed in commonly assigned patent application Ser. No. 12/341,561, filed Dec. 22, 2008, by Dennis J. Schuitema et al., the disclosure of which is hereby incorporated herein by reference. Once the spacing between the confinement surfaces defined by bars 24 is measured along the frame, the spacing, and in particular locations where spacing is out of specification, may be recorded (58). If it is determined at 60 that lateral spacing is less than specification at particular locations, then lateral spacing between the confinement surfaces may be set to specification (62) by adjusting positions of at least some of the antifriction bars 24. This may be accomplished, for example, by shimming at least some of said bars.

Audit 50 may include both measuring the slat skew (52) and measuring the distances between the confinement surfaces (56). Slat skew, when combined with binding of the web between the confinement surface, can result in even greater drag than either alone. Of course it should be understood that these audit steps can be performed separately or together. Other audit steps may be performed to diagnose cause of drag. For example, the force created by contact between web 12 and a confinement surface 24 may be measured using the principles set forth in Schuitema et al. patent application Ser. No. 12/341,561 referred to above.

It is believed that the embodiments of the method and apparatus disclosed herein are capable of reducing drag on the web of a sorter for various reasons. The locking of the sprockets on the non-driven sprocket assembly resists the tendency of one chain assembly to get ahead of the other chain assembly, thereby skewing the slats. The non-driven sprocket assembly is typically at the charge end of the sorter where articles are deposited on the conveying surface to be sorted. It is believed that uneven forces resulting from the diverting of articles to one side of the sorter causes the slats to skew. The skewed slats are believed to be a source of drag on the web. Thus, although it is counterintuitive to lock the non-driven sprockets together and thereby allow uneven load to be applied to the chain assemblies, the locked sprockets overcome a component of increased web drag. This is because the locked sprockets force the chain assemblies to travel in unison with each other thereby reducing slat skew, a source of drag.

The reduction of binding of the web against its confinement surfaces is also believed to reduce web drag. Thus, by utilizing side thrust wheels, any effect tending to increase friction between the web and the confinement surface is reduced. It should apparent to the skilled artisan that the slat skew is also likely to increase binding of the web against its confinement surfaces thereby increasing drag beyond that caused by slat skew, per se. So, the techniques disclosed herein are capable of synergistic operation.

Once corrections are made to the sorter, audit 50 may be repeated in order to ensure that the sorter is operating within specification. This may be accomplished by comparing, for example, amp draw and/or slat skew stored at 54 with a current measurement and/or by comparing lateral spacing between the confinement surfaces with that stored at 58.

Also, other adjustments may be made to the sorter. For example, if the sorter has a chain oiler, such as of the type disclosed in the '751 patent discussed above, the program of the oiler may be adjusted. Such adjustment may include adjusting the set points of the program. Although such an automated oiler will eventually adapt to the corrections of slat skew, a manual adjustment of the set points will speed the adjustment to a lower oiling level. Also, if the oiler operates at fixed set points, these can be adjusted after the drag is corrected to apply a lower amount of oil.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A method of reducing drag on the web of a positive displacement sorter, said web comprising a plurality of parallel slats interconnected at their opposite ends with chain assemblies in an endless loop and a plurality of pusher shoes, each traveling along at least one of said slats, said sorter further comprising a driven sprocket assembly and a non-driven sprocket assembly, each of said sprocket assemblies comprising at least two sprockets on a shaft, each for engaging one of said chain assemblies, said sprocket assemblies supporting said chain assemblies at opposite ends of said web, said method comprising:
   auditing the sorter including determining if the slats are skewed with respect to the direction of travel of said web;
   if said slats are skewed, then modifying said chain assemblies and said non-driven sprocket assembly;
   said modifying said chain assemblies comprising adding side thrust wheels on opposite sides of said web; and
   said modifying said non-driven sprocket comprising locking the sprockets to said shaft such that teeth of said sprockets are generally in line with each other and said sprockets rotate together.

2. The method as claimed in claim 1 wherein said chain assemblies include chains and existing brackets connecting chain assemblies with said slats of said existing brackets, wherein said modifying said chain assemblies comprises replacing at least some with new brackets connecting said chains with said slats, said new brackets having said side thrust wheels.

3. The method as claimed in claim 1 wherein said modifying said chain assemblies comprises replacing said chain assemblies with new chain assemblies having said side thrust wheels.

4. The method as claimed in claim 1 wherein said adding side thrust wheels comprises adding said side thrust wheels to fewer than all of said slats.

5. The method as claimed in claim 4 including positioning said side thrust wheels on alternate sides of said web such that each of said slats has no more than one of said side thrust wheels.

6. The method as claimed in claim 5 including positioning said side thrust wheels on no more than every sixth slat on a side of said web.

7. The method as claimed in claim 5 including positioning said side thrust wheels on no more than every seventh slat on a side of said web.

8. The method as claimed in claim 1 wherein the sorter further comprises a frame moveably supporting said web, said frame having facing confinement surfaces for resisting lateral movement of said web, wherein said auditing further includes determining spacing between said confinement surfaces.

9. The method as claimed in claim 8 wherein said confinement surfaces are defined by low friction bars and further comprising adjusting positions of at least some of said bars to adjust the spacing between said confinements surfaces.

10. The method as claimed in claim 9 wherein said adjusting positions of at least some of said bars comprises shimming said at least some of said bars.

11. The method as claimed in claim 8 wherein said auditing comprises positioning at least one sensor on one of said slats and operating the sorter while monitoring said at least one sensor in order to determine spacing between said confinement surfaces.

12. The method as claimed in claim 1 wherein said sorter further comprises an oiler, said oiler applying oil intermittently at each of said chain assemblies according to a program and further including adjusting said program.

13. The method as claimed in claim 1 wherein said auditing comprises measuring spacing of opposite ends of at least one of said slats from a fixed reference and wherein said determining includes determining slat skew as a function of the difference in spacing of one end of said at least one of said slats from the fixed reference to the spacing of the opposite end of said at least one of said slats from the fixed reference.

14. A method of retrofitting a positive displacement sorter in order to reduce drag on a web of the sorter, said sorter having confinement members adjacent lateral ends of said web, said confinement members adapted to resist lateral motion of said web, said web made up of a plurality of parallel slats interconnected at their opposite ends with chain assemblies in an endless loop, a plurality of vertical support wheels rotating on generally horizontal axes to support said slats and a plurality of pusher shoes each traveling along at least one of said slats, said web supported by a driven sprocket assembly and a non-driven sprocket assembly at opposite ends of said web, each of said sprocket assemblies comprising at least two sprockets on a shaft each for engaging one of said chain assemblies, said method comprising:
   mounting side thrust wheels on both lateral sides of said web to resist lateral movement of said web, said side thrust wheels rotating on axes that are perpendicular to the axis of rotation of said support wheels, wherein no more than one end of each of said slats receives one of said side thrust wheels.

15. The method as claimed in claim 14 wherein said mounting side thrust wheels includes replacing said chain assemblies with new chain assemblies, each of said new chain assemblies including an endless new chain and a plurality of brackets with side thrust wheels attached to said plurality of brackets.

16. The method as claimed in claim 15 wherein said new chain assemblies include said side thrust wheels being at no more than every sixth slat.

17. The method as claimed in claim 15 wherein said new chain assemblies include said side thrust wheels being at no more than every seventh slat on a side of said web.

18. The method as claimed in claim 15 including mounting said new chain assemblies with said side thrust wheels on alternate sides of said web with respect to said slats.

19. The method as claimed in claim 14 including replacing said non-driven sprocket assembly with a new non-driven sprocket assembly including a shaft and sprockets for engaging said new chain assemblies, wherein the sprockets of said new non-driven sprocket assembly lock to said shaft of said new non-driven sprocket assembly wherein teeth of said sprockets of said new non-driven sprocket assembly rotate together.

20. The method as claimed in claim 14 including auditing the sorter by determining if the slats are skewed with respect to the direction of travel of said web.

\* \* \* \* \*